United States Patent [19]

Mallon

[11] 4,320,994
[45] Mar. 23, 1982

[54] PREPARATION OF GROUT FOR STABILIZATION OF ABANDONED IN-SITU OIL SHALE RETORTS

[75] Inventor: Richard G. Mallon, Livermore, Calif.

[73] Assignee: The United States of America as represented by the United States Department of Energy, Washington, D.C.

[21] Appl. No.: 101,364

[22] Filed: Dec. 7, 1979

[51] Int. Cl.$^3$ .............................................. E21C 41/10
[52] U.S. Cl. ........................................ 405/267; 299/2; 299/11; 106/100; 106/103
[58] Field of Search .................... 106/103, 100; 299/2, 299/11; 405/266, 267

[56] References Cited

U.S. PATENT DOCUMENTS

| 2,434,815 | 1/1948 | Shaw | 208/11 R |
| 3,459,003 | 8/1969 | O'Neal | 299/11 |
| 4,131,416 | 12/1978 | Watson et al. | 299/11 |
| 4,198,097 | 4/1980 | Fondriest | 299/11 |

OTHER PUBLICATIONS

"Effects of Gas Environment on Mineral Reactions in Colorado Oil Shale", Burnham et al., UCRL 81951, 12-7-1978.

"Disposal of Spent Shale Ash in In Situ Retorted Caverns" Nevens et al., May 1977.

*Primary Examiner*—William F. Pate, III
*Attorney, Agent, or Firm*—L. E. Carnahan; Richard G. Besha; James E. Denny

[57] ABSTRACT

A process for the preparation of grout from burned shale by treating the burned shale in steam at approximately 700° C. to maximize the production of the materials alite and larnite. Oil shale removed to the surface during the preparation of an in-situ retort is first retorted on the surface and then the carbon is burned off, leaving burned shale. The burned shale is treated in steam at approximately 700° C. for about 70 minutes. The treated shale is then ground and mixed with water to produce a grout which is pumped into an abandoned, processed in-situ retort, flowing into the void spaces and then bonding up to form a rigid, solidified mass which prevents surface subsidence and leaching of the spent shale by ground water.

10 Claims, 3 Drawing Figures

PREPARATION OF GROUT FOR STABILIZATION OF ABANDONED IN-SITU OIL SHALE RETORTS

BACKGROUND OF THE INVENTION

The invention described herein is a result of work performed at Lawrence Livermore Laboratory under Contract W-7405-ENG-48 between the United States Department of Energy and the University of California.

The invention relates to methods of backfilling abandoned in-situ retorts using spent oil shale, and more particularly to a method of producing grout by treating burned shale to maximize the production of hydraulic compounds from carbonate minerals.

Vast amounts of oil shale rock are found in the western United States, particularly Colorado. Oil shale contains a polymeric organic material, kerogen, which decomposes upon heating to give oil. The oil reserves present in the oil shale in the United States are estimated to be greater than all the oil reserves in the Middle East.

One method of producing oil from shale is a modified in-situ retorting process in which rubblized oil shale is burned underground to yield oil and the oil is pumped out. A retort, with lateral dimensions up to 100 m × 100 m and height up to 300 m, is ignited at the top and a combustion zone is forced downward by flow of oxygen-containing gas. Oil is released ahead of (below) the combustion zone. However, the in-situ retorting process cannot occur unless the underground material is first made permeable by creating void space in the retort. Accordingly, approximately 20% of the material in the region to be processed is removed by conventional mining techniques. The remaining material is rubblized to make it permeable to permit in-situ retorting. The material removed is retorted on the surface to produce additional oil. Three basic types of surface retorts are known in the art, the combustion retort, the hot gas retort, and the hot solid retort.

There are several severe environmental drawbacks to the in-situ retorting process. The spent shale left after retorting may compress, causing subsidence of the surface. The materials remaining in the retort after processing can also release compounds into flowing ground water. Toxic gases may be released. The surface retorting of the material removed produces waste which also must be disposed.

A solution to these problems is to put the waste material produced by the surface retorting back underground, filling and solidifying the in-situ retort. However, since the mining tunnels used for the removal of the material have been destroyed in the rubblization process, the material cannot be replaced as a solid. It has been proposed to convert the material into a slurry for injection into the retort.

Several United States patents are directed to methods of treating spent oil shale, including methods of producing a slurry for backfilling an in-situ retort.

U.S. Pat. No. 4,096,912 to Lewis and Mallon, issued June 27, 1978, shows a method of minimizing plastic flow of hot rubblized oil shale in an in-situ retort by introducing carbon dioxide and water into the spent shale above a downwardly moving retorting zone. The reaction with the mineral consituents of the spent shale forms a cement-like material. It is preferable to first burn the spent shale in-situ to remove carbonaceous residue. The water may be introduced as steam.

U.S. Pat. No. 4,131,416 to Watson and Spear, issued Dec. 26, 1978, describes the heating of spent oil shale to temperatures ranging from 1200° to 1500° F. and mixing the treated shale with water to form a slurry for backfilling a in-situ retort. An additional slurry of sand or other porous material is also added to the retort to allow drainage of the water.

U.S. Pat. No. 4,120,355 to Knepper and Grossman, issued Oct. 17, 1978, also describes the treatment of spent oil shale at 1200° to 1500° F. for the production of backfilling slurry.

U.S. Pat. No. 3,459,003 to O'Neal teaches adding calcium carbonate and calcium oxide, clay or gypsum to spent oil shale and heating the mixture to form cement clinker. This cement clinker may then be mixed with water and reintroduced to the mined-out area as a slurry.

U.S. Pat. No. 3,135,618 to Friese, issued June 2, 1964, discloses a process for producing cement using pretreated oil shale. The oil shale is pretreated by fluidized bed partial oxidation at 400° to 650° C. in the presence of a reduced oxygen supply. The pretreated oil shale is then mixed with calcareous material and heated to high temperature for the production of cement.

U.S. Pat. No. 2,434,815 to Shaw, issued Jan. 20, 1948, describes a method for separating oil from oil shale by contacting the shale with super-heated steam at a temperature between about 600° and 1200° F. Steam is brought into contact with hot spent shale to produce super-heated steam.

The available methods for treating spent shale to produce a slurry result in a slurry with a high water content which does not solidify easily and therefore cannot support the overburden or stop water flow. Therefore, the environmental problems of subsidence and leaching are not eliminated. Furthermore, the process requires large amounts of water which is a very scarce resource in the parts of the United States where oil shale deposits are found and there are many high priority competing uses such as agriculture for the available water supply. The failure of the slurry injection methods is described in the study of the Denver Research Institute May 1977 Report.

Accordingly, it is an object of the invention to provide a method for stabilizing abandoned in-situ oil shale retorts.

It is a further object of the invention to provide a method for treating surface processed shale to produce a grout for stabilizing abandoned in-situ oil shale retorts.

It is a further object of the invention to produce a grout from spent shale which is sufficiently non-viscous for injecting into a retort and becomes rigid and strong upon setting.

It is also an object of the invention to provide a process for reacting carbonate minerals in oil shale.

It is another object of the invention to provide a process for treating spent shale which maximizes the conversion of carbonate minerals into hydraulic compounds.

It is a further object of the invention to produce a grout with a maximum composition of the compounds alite and larnite.

SUMMARY OF THE INVENTION

The invention is a process for treating oil shale removed from an in-situ retort to produce a grout for stabilization of the abandoned in-situ retort. The oil shale removed to the surface is first retorted on the surface to produce oil, leaving spent shale. Then the carbon is burned off the spent shale, leaving burned shale. The burned shale is treated in steam at approximately 700° C. for about 70 minutes to produce a grout made up of the strength producing materials alite $3CaO \cdot SiO_2$ and larnite $2CaO \cdot SiO_2$. The treated shale is ground, mixed with water and pumped into an abandoned in-situ retort, flowing into the spaces and then bonding up to form a rigid solidified mass which prevents surface subsidence and leaching of the spent shale by ground water.

DETAILED DESCRIPTION OF THE PREFERRED EMBODIMENT

Figure 1:
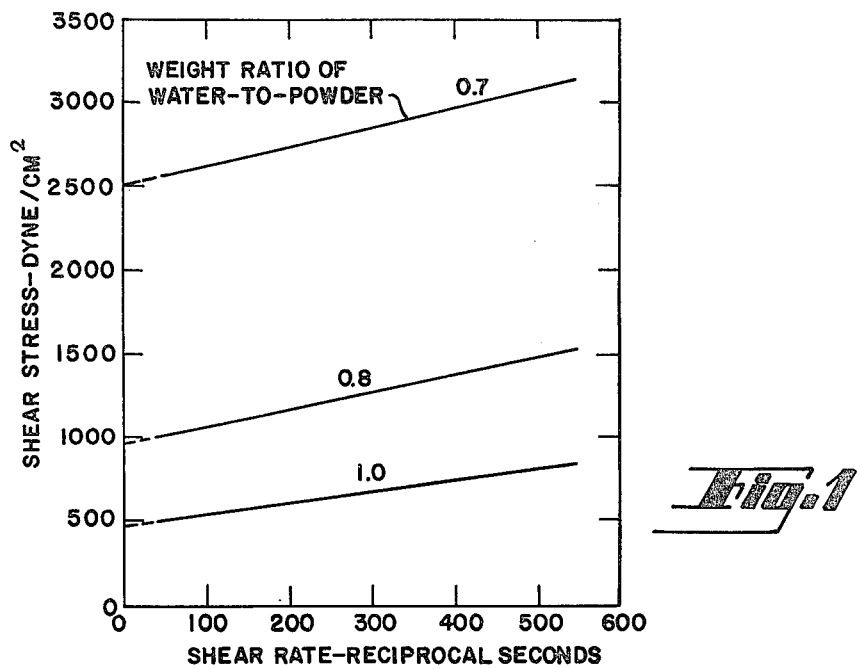
FIG. 1 shows the flow characteristics of oil shale grout for various amounts of water addition.

The invention is a process for treating oil shale taken to the surface from an in-situ retort to form a grout which can then be returned underground and used to fill the void space in a processed in-situ retort. After crushing the shale taken to the surface, a three step heat treatment process is used. First the shale is retorted in an oxygen-free atmosphere. Second, carbonaceous residue or char is burned off the shale. Both the steps of retorting and burning are performed at low enough temperature so that most of the carbonate minerals in the shale do not decompose. One conventional process which can be used to perform the first two steps is the Lurgi-Ruhrgas process described in "The Use of the Lurgi-Ruhrgas Process for the Distillation of Oil Shale", I. P. Schmalfeld, Proceedings of the 8th Oil Shale Symposium, Quarterly Report, Colorado School of Mines, V. 70, No. 3, pp. 129–145, July 1975. Third, the burned shale is treated at a higher temperature in a gaseous environment to cause a reaction between the carbonate and silicate minerals in the shale, producing a product with properties similar to ordinary cement. The treated shale is then ground into a fine powder and water is added to produce grout which is injected underground to fill the void space in a processed in-situ retort. The invention is described in report UCRL-82455, "Preparation and Injection of Grout from Spent Shale for Stabilization of Abandoned In-Situ Oil Shale Retorts", Richard G. Mallon, Lawrence Livermore Laboratory, June 25, 1979, which is herein incorporated by reference.

Oil shale contains the organic compound kerogen plus various carbonate and silicate minerals. The high temperature treatment of burned oil shale produces a complex group of calcium silicates including the following compounds which have been observed by x-ray diffraction:

| | |
|---|---|
| Diopside | $CaMgSi_2O_6$ |
| Ackermanite | $Ca_2MgSi_2O_7$ |
| Gehlenite | $Ca_2Al_2SiO_7$ |
| Merwinite | $Ca_3MgSi_2O_8$ |
| Spurrite | $Ca_5Si_2O_8CO_3$ |
| Wollastonite | $CaSiO_3$ |
| Larnite | $Ca_2SiO_4$ |
| Alite | $Ca_3SiO_5$ |

The rates of formation of these minerals are greatly influenced by temperature and by gaseous environment. For grout preparation, alite and larnite are highly desirable since they are hydraulic compounds which upon water addition form cohesive hydrates and become rigid and strong. These two compounds are the principal strength components of Portland cement. The high temperature step of the process according to the invention maximizes the production of alite and larnite while minimizing or completely avoiding the production of all other calcium compounds. This step comprises treating burned shale at a temperature of about 700° C. for about 70 minutes in a gaseous environment of substantially all steam.

The temperature must be high enough, over 650° C., to cause the carbonates and silicates to react to produce hydraulic compounds, but lower than 750° C. Preferably, the temperature is around 700° C., such as in the range 690°–710° C. The treatment time determines the percentage of conversion to the desired hydraulic compounds. Treatment for 70 min. at 700° C. results in about 95% conversion; a shorter treatment time would result in a smaller amount of the minerals being converted.

Experimental preparation of grout according to the invention was performed with oil shale from the mine at Anvil Points, Colo. with a composition by weight of:

| | |
|---|---|
| Kerogen | 13% |
| Dolomite | 32% |
| Calcite | 11% |
| Silicates | 44% |

The treatment process is, however, independent of the shale composition since the same temperature is required to produce a reaction of the carbonate and silicate minerals present in the shale.

The shale was processed in an electric furnace with a controlled constantly flowing atmosphere. The shale was first heated to 500° C. in nitrogen, releasing the oil and leaving spent shale. Next, air was gradually added to the flowing gas to burn the char, leaving burned shale. The oxygen concentration was increased as rapidly as possible without exceeding a shale temperature of 650° C. When the combustion of the char was complete as indicated by the end of heat production, the gas flow was changed to 100% air and the temperature was increased to 700° C. The flow was then changed to steam. The burned shale was treated in steam at 700° C. for 70 minutes before heaters were turned off and the material cooled in flowing nitrogen.

X-ray diffraction analysis of the treated shale showed diffraction lines for alite and larnite. No other calcium compounds were detected. This indicates that all the calcium in the shale had reacted to form alite and larnite, the desired strength producing components.

The grout prepared by the three step process has sufficient mobility that it can be readily pumped and will easily flow into the void space underground. The treated shale is ground and measured amounts of water are added to form the grout. The flow characteristics are measured with a rotoviscometer which measures shear stress as a function of shear rate. The behavior of the grout is found to be that of a Bingham plastic similar to neat cement which is formed by mixing Portland cement with water.

The flow characteristics of the oil shale grout for various amounts of water addition are shown in FIG. 1.

Figure 2:
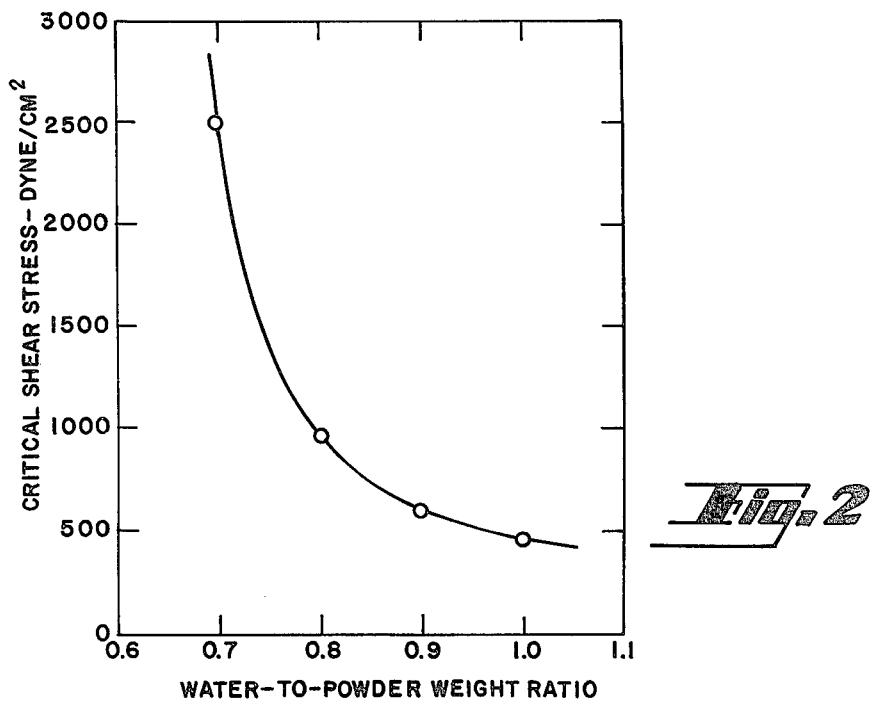
FIG. 2 shows the critical shear stress as a function of the amount of water added to dry, powdered, treated shale.

The critical shear stress for the grout is the value at the intersection with the ordinate. For shear rates of interest, the actual shear stress is close to the critical value so this value essentially determines grout mobility. The critical shear stress as a function of the amount of water added to the dry, powdered, treated shale is shown in FIG. 2. From this curve, a water to powder ratio of 0.8 by weight is selected as the optimum for grouting in-situ retorts. Lower water content results in much lower grout mobility. Higher water content does not greatly increase mobility but probably reduces the strength of the hardened grout. Using the measured properties of the grout, it is estimated that the maximum distance of grout penetration in a retort is 26 m. Thus only a few injection points will be required to completely grout an abandoned retort.

Figure 3:
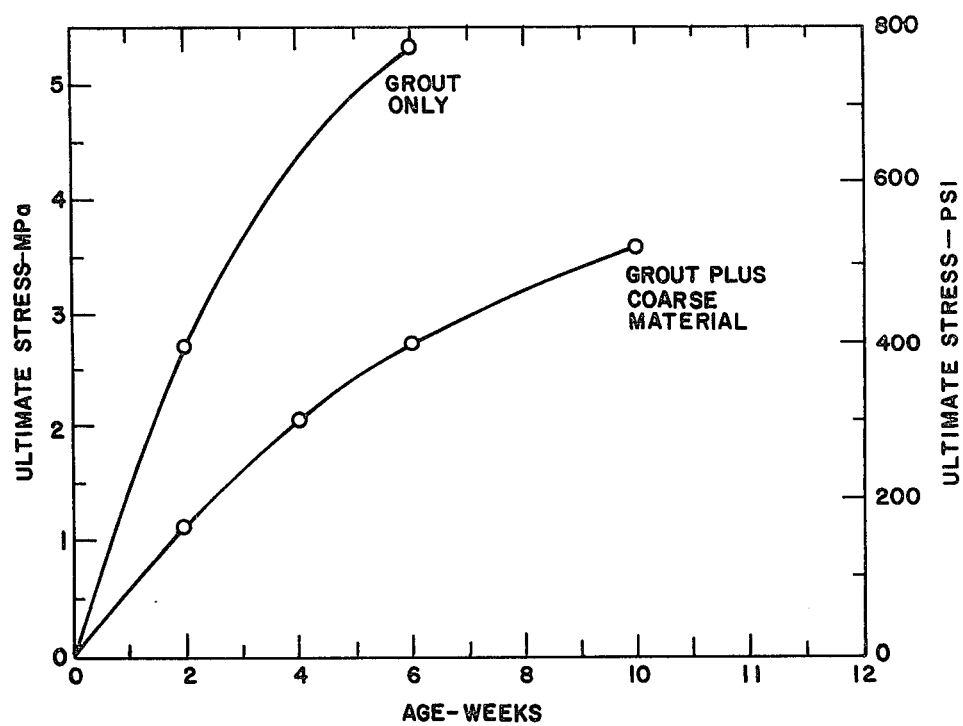
FIG. 3 shows the strength of the grout as a function of time.

The grout solidifies very quickly, in a day or two, and then builds up in strength, reaching full strength in about 15 weeks, to become a rigid, strong material. The ability to support an overburden at a particular strength depends on the type and thickness of overburden, but is improved because the grout is confined. The strength of the hardened grout was measured by unconfined compression tests on cylindrical samples. Two types of samples were tested, all grout and a 50%—50% mixture of grout and coarse material made up of burned oil shale such as would be found in the retort rubble. The results of the strength tests for the two types of samples are shown in FIG. 3. For the grouted shale, the strength at 10 weeks is 3.6 MPa (522 psi) and continuing to increase. It appears that the coarse material makes almost no contribution to the sample strength. It also appears that the hydration process in the oil shale grout is much slower than that of ordinary Portland cement which develops nearly full strength in four weeks. In Portland cement, the mineral alite, which hydrates much more rapidly, is about twice as abundant as larnite. In the grout, larnite is more abundant than alite.

The grout, after setting, has a very low permeability to water. The permeability of a mixture of grout and coarse shale, aged four weeks, was measured to be 0.4 millidarcy. The horizontal permeability of undisturbed oil shale is estimated to be about 200 millidarcy. Therefore, horizontal motion of ground water will be around the retort and not through it, so that leaching from the burned shale in the retort should be minimal. The vertical permeability of undisturbed oil shale is estimated to be about 0.5 millidarcy. Since the vertical permeability of a grouted retort will be about the same as that of undisturbed rock, the presence of the retort will not increase transfer of water from one aquifer to another.

In order to inject the grout prepared according to the invention into a abandoned in-situ retort, the bottom of the retort would first be sealed and water would be added to a depth of about 10m. It is necessary to first wet the material in the retort in order to allow the grout to flow around the material. One or several grout injection pipes would be placed from the surface to within a few meters of the bottom. Dry, powdered, treated shale prepared according to the invention would be transported to the surface location. Using continuous flow apparatus the powder would be mixed with water in the proper proportion, preferably at a water to powder ratio of 0.8 by weight, and pumped into all the injection pipes. Since the grout is denser than water it would accumulate in the bottom of the retort. There would be little mixing of the grout with the water in the retort because there is no mixing action in the injection process. The grout is a concrete-like material, produced by vigorously mixing dry powder and water, and would displace the water in the retort. The level of grout would move upward with a layer of water above it. To further avoid mixing, less water can be placed in the retort initially, and more water can be added later as the retort is being filled with grout. The grouting pipes would gradually be withdrawn to keep the injection point 10 to 20 meters below the surface. The grout would be injected continuously until all voids in the retort have been filled, including the gas flow space at the top.

In addition to solidifying an abandoned in-situ retort and preventing ground water leaching, another objective of the invention is to provide for the underground disposal of the shale removed from the retort to permit rubblization. Because of the reduced density of the material after processing, only about half of the shale removed can be reinjected. Thus half of the surface waste is disposed of while accomplishing other objectives of the invention. The remaining portion must be disposed separately or because of its strength properties may be usable as a construction material. Furthermore, suitable grouting of burned out retorts may permit the closer spacing of in-situ retorts, and may also permit the processing of the pillars or barrier walls between retorts, thereby significantly increasing resource utilization.

Changes and modifications in the specifically described embodiments can be carried out without departing from the scope of the invention which is intended to be limited only by the scope of the appended claims.

What is claimed is:

1. A process for treating shale containing carbonate and silicate minerals for use as grout for filling abandoned in-situ oil shale retorts, comprising:

treating the shale in a gaseous environment of substantially steam at a temperature high enough to cause a reaction between the carbonate and silicate minerals which maximizes the production of strength producing hydraulic compounds and minimizes or completely avoids the production of all other calcium compounds.

2. The process of claim 1, wherein the temperature is approximately 700° C.

3. The process of claim 1 wherein the strength producing hydraulic compounds are alite and larnite.

4. The process of claim 1 further comprising the additional step of burning the shale for the removal of carbon prior to the step of treating the shale in a gaseous environment at a high temperature.

5. A process for the preparation of grout for the stabilization of abandoned, processed in-situ oil shale retorts from oil shale containing carbonate and silicate minerals which has been removed from an in-situ retort, comprising:

surface retorting the oil shale removed from the in-situ retort, thereby producing oil and leaving spent shale containing carbon;

removing substantially all the carbon from the spent shale, leaving burned shale;

treating the burned shale in a gaseous environment of substantially steam at a high temperature to produce treated shale with a maximum composition of hydraulic materials;

grinding the treated shale into a powder; and mixing the powder with water.

6. The process of claim 5, wherein the step of removing the carbon from the spent shale is performed by burning off the carbon from the spent shale.

7. The process of claim 6, wherein the steps of surface retorting and burning off the carbon are carried out at temperatures below the decomposition temperature of most of the carbonate minerals in the oil shale, and the step of treating the burned shale is carried out at approximately 700° C.

8. The process of claim 5, wherein water is mixed with powder of treated shale in a ratio of water to powder of approximately 0.8 by weight.

9. The process of claim 7, wherein water is mixed with powder of treated shale in a ratio of water to powder of approximately 0.8 by weight.

10. A method for stabilizing an abandoned, processed in-situ oil shale retort using oil shale which has been removed from the retort in the preparation process, comprising:

surface retorting the oil shale removed from the in-situ retort, thereby producing oil shale and leaving spent shale containing carbon;

burning off substantially all the carbon from the spent shale, leaving burned shale;

treating the burned shale in steam at approximately 700° C. for approximately 70 minutes to produce treated shale with a high composition of the strength materials alite and larnite;

grinding the treated shale into powder;

mixing the powder with water in a ratio of water to powder of approximately 0.8 by weight to produce a grout; and injecting the grout into the abandoned, processed in-situ retort to fill void spaces and solidify into a rigid mass.

* * * * *